(12) United States Patent
Cotton et al.

(10) Patent No.: US 11,506,629 B2
(45) Date of Patent: Nov. 22, 2022

(54) APPARATUS AND METHOD FOR PROVIDING A TIME VARYING VOLTAGE

(71) Applicant: Nokia Technologies Oy, Espoo (FI)

(72) Inventors: Darryl Cotton, Cambridgeshire (GB); Adam Robinson, Cambridgeshire (GB); Di Wei, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 23 days.

(21) Appl. No.: 15/575,099

(22) PCT Filed: May 13, 2016

(86) PCT No.: PCT/FI2016/050319
§ 371 (c)(1),
(2) Date: Nov. 17, 2017

(87) PCT Pub. No.: WO2016/185087
PCT Pub. Date: Nov. 24, 2016

(65) Prior Publication Data
US 2018/0143160 A1 May 24, 2018

(30) Foreign Application Priority Data
May 21, 2015 (EP) ..................... 15168585

(51) Int. Cl.
*H01H 29/00* (2006.01)
*H01H 29/06* (2006.01)
(Continued)

(52) U.S. Cl.
CPC ........... *G01N 27/49* (2013.01); *H01H 29/006* (2013.01); *H01H 29/06* (2013.01); *G01N 27/4166* (2013.01); *H01H 2029/008* (2013.01)

(58) Field of Classification Search
CPC .. G01N 27/49; G01N 27/4166; H01H 29/006; H01H 29/06; H01H 2029/008
See application file for complete search history.

(56) References Cited

U.S. PATENT DOCUMENTS

| 2,441,896 | A | * | 5/1948 | Moir | ..................... | H01M 6/045 |
| | | | | | | 429/116 |
| 5,959,535 | A | * | 9/1999 | Remsburg | ............... | A61F 13/42 |
| | | | | | | 340/604 |

(Continued)

FOREIGN PATENT DOCUMENTS

| CN | 103907406 A | 7/2014 |
| EP | 1 235 238 A2 | 8/2002 |

(Continued)

OTHER PUBLICATIONS

F. Amemiya, et al., Electrochemical Conversion of Benzylamine to Dibenzylamine Using a Microreactor: Analogous System of Photocatalytic Redox Combined Synthesis, Chem. Lett., vol. 40, pp. 606-608 (2011) (Year: 2011).*

(Continued)

*Primary Examiner* — Maris R Kessel
(74) *Attorney, Agent, or Firm* — Harrington & Smith (57) ABSTRACT

An apparatus and method wherein the apparatus includes a channel; at least one pair of electrodes provided within sides of the channel; an electrolyte configured to move through the channel such that when the electrolyte is positioned between the at least one pair of electrodes the electrolyte provides a current path between the at least one pair of electrodes; and wherein the at least one pair of electrodes are configured such that movement of the electrolyte through the channel enables a time varying voltage to be provided.

13 Claims, 8 Drawing Sheets

(51) Int. Cl.
*G01N 27/416* (2006.01)
*G01N 27/49* (2006.01)

(56) References Cited

U.S. PATENT DOCUMENTS

| | | | | |
|---|---|---|---|---|
| 6,212,956 | B1 * | 4/2001 | Donald | G01N 27/221 |
| | | | | 73/724 |
| 6,653,136 | B1 | 11/2003 | Dodgson et al. | 435/461 |
| 6,696,020 | B1 * | 2/2004 | Manz | G01N 21/76 |
| | | | | 204/194 |
| 6,748,804 | B1 * | 6/2004 | Lisec | G01F 23/242 |
| | | | | 73/290 R |
| 7,898,096 | B1 * | 3/2011 | Krupenkin | H02N 1/08 |
| | | | | 290/1 R |
| 8,889,281 | B2 * | 11/2014 | La Mantia | H01M 6/34 |
| | | | | 429/101 |
| 2004/0011650 | A1 * | 1/2004 | Zenhausern | B01L 3/502746 |
| | | | | 204/547 |
| 2004/0115520 | A1 * | 6/2004 | Cardenas-Valencia | |
| | | | | H01M 50/60 |
| | | | | 429/70 |
| 2005/0019802 | A1 * | 1/2005 | Bahatt | G01N 21/66 |
| | | | | 435/6.11 |
| 2005/0118705 | A1 | 6/2005 | Rabbitt et al. | 435/287.1 |
| 2005/0233198 | A1 * | 10/2005 | Nuzzo | H01M 4/8605 |
| | | | | 204/432 |
| 2006/0013731 | A1 | 1/2006 | Stout et al. | 422/68.1 |
| 2006/0077762 | A1 * | 4/2006 | Boland | H02N 11/002 |
| | | | | 367/170 |
| 2009/0038938 | A1 * | 2/2009 | Mezic | B01F 13/0071 |
| | | | | 204/400 |
| 2009/0315720 | A1 * | 12/2009 | Clement | A61F 13/42 |
| | | | | 340/573.5 |
| 2010/0270156 | A1 * | 10/2010 | Srinivasan | F04B 19/006 |
| | | | | 204/450 |
| 2013/0043132 | A1 * | 2/2013 | Liu | B03C 1/32 |
| | | | | 204/547 |
| 2013/0081945 | A1 * | 4/2013 | Joo | B01L 3/502761 |
| | | | | 204/451 |
| 2015/0123513 | A1 * | 5/2015 | Kim | H02N 1/08 |
| | | | | 310/300 |
| 2015/0295516 | A1 * | 10/2015 | Kwon | H02N 1/08 |
| | | | | 310/300 |

FOREIGN PATENT DOCUMENTS

| | | |
|---|---|---|
| EP | 1 173 599 B1 | 7/2005 |
| WO | WO 81/03546 | 12/1981 |
| WO | WO-03044817 A1 | 5/2003 |
| WO | WO-2015049577 A1 * | 4/2015 ............ H01H 29/18 |

OTHER PUBLICATIONS

S. Golan et al., Hybrid dielectrophoresis devices that employ electrically floating electrodes, Sensors and Actuators A, vol. 142, pp. 138-146 (2008) (Year: 2008).*

T. Krupenkin et al., Reverse electrowetting as a new approach to high-power energy harvesting, Nature Communications 2, No. 448, pp. 1-7 (2011) (Year: 2011).*

F. La Mantia et al., Batteries for Efficient Energy Extraction from a Water Salinity Difference, Nano Letters, vol. 11 No. 4, pp. 1810-1813 (2011) (Year: 2011).*

H. Liu et al., Paper-Based Electrochemical Sensing Platform with Integral Battery and Electrochromic Read-Out, vol. 84, No. 5, pp. 2528-2532 (2012) (Year: 2012).*

K.B. Lee, Two-step activation of paper batteries for high power generation: design and fabrication of biofluid- and water-activated paper batteries, J. Micromech. Microeng, vol. 16, pp. 2312-2317 (2006) (Year: 2006).*

E. F. Garay, Biofluid activated microbattery for disposable microsystems, Journal of Microelectromechanical Systems, vol. 24, No. 1 pp. 70-79 (Feb. 1, 2015) (Year: 2015).*

Ito, Masatoshi, et al., "Low Physical Restriction MEMS Potentiometer Using Probe Dipping µPool with Conductive Liquid", Jan. 24, 2010, 2010 IEEE $23^{rd}$ International Conference, Piscataway, New Jersey, USA, 4 sheets.

* cited by examiner

APPARATUS AND METHOD FOR PROVIDING A TIME VARYING VOLTAGE

TECHNOLOGICAL FIELD

Examples of the disclosure relate to an apparatus and method for providing a time varying voltage. In particular, examples of the disclosure relate to an apparatus and method for providing a time varying voltage to a sample to enable an analyte to be detected within the sample.

BACKGROUND

Apparatus which provide time varying voltages are known. Such voltages may be used to test the conductivity of a sample and determine the presence and/or concentration of an analyte within the sample.

The electronics typically used to provide a time varying voltage are complex and require components such as a microcontroller, timing circuitry, memory, dedicated software/firmware and power management.

It is useful to provide a simpler apparatus for providing a time varying voltage.

BRIEF SUMMARY

According to various, but not necessarily all, examples of the disclosure, there may be provided an apparatus comprising: a channel; at least one pair of electrodes provided within sides of the channel; an electrolyte configured to move through the channel such that when the electrolyte is positioned between the at least one pair of electrodes the electrolyte provides a current path between the at least one pair of electrodes; and wherein the at least one pair of electrodes are configured such that movement of the electrolyte through the channel enables a time varying voltage to be provided.

In some examples the apparatus may be configured to provide a current to a sample to enable an analyte to be detected within the sample.

In some examples the channel and the electrolyte may be configured such that the electrolyte moves through the channel at a controlled rate.

In some examples the channel may comprise a microfluidic channel.

In some examples a potential difference between the at least one pair of electrodes and the electrolyte may be dependent upon the position of the electrolyte within the channel.

In some examples the electrodes may comprise different materials at different points along the length of the channel.

In some examples the apparatus may further comprise at least one floating electrode provided in a wall of the channel. The floating electrode may be configured to reduce current through the pair of electrodes by collecting electrons from the electrolyte. In some examples the floating electrode may comprise the same material as a cathode of the at least one pair of electrodes. The floating electrode might not overlap another electrode.

In some examples the electrolyte may comprise an ionic solution configured to undergo an electrochemical reaction with the at least one pair of electrodes.

In some examples an inert liquid may be provided adjacent to the electrolyte wherein the inert liquid does not undergo an electrochemical reaction with the at least one pair of electrodes. The electrolyte and the inert liquid may be immiscible.

In some examples there may be provided a test device comprising an apparatus as described above.

According to various, but not necessarily all, examples of the disclosure, there may be provided a method comprising: providing a channel; providing at least one pair of electrodes provided within sides of the channel; providing an electrolyte configured to move through the channel such that when the electrolyte is positioned between the at least one pair of electrodes the electrolyte provides a current path between the at least one pair of electrodes; and wherein the at least one pair of electrodes are configured such that movement of the electrolyte through the channel enables a time varying voltage to be provided.

In some examples the method may further comprise enabling a current to be provided to a sample to enable an analyte to be detected within the sample.

In some examples the channel and the electrolyte may be configured such that the electrolyte moves through the channel at a controlled rate.

In some examples the channel may comprise a microfluidic channel.

In some examples a potential difference between the at least one pair of electrodes and the electrolyte may be dependent upon the position of the electrolyte within the channel.

In some examples the electrodes may comprise different materials at different points along the length of the channel.

In some examples the method may further comprise providing at least one floating electrode provided in a wall of the channel. The floating electrode may be configured to reduce current through the pair of electrodes by collecting electrons from the electrolyte. The floating electrode may comprise the same material as a cathode of the at least one pair of electrodes. The floating electrode might not overlap another electrode.

In some examples the electrolyte may comprise an ionic solution configured to undergo an electrochemical reaction with the at least one pair of electrodes.

In some examples the method may further comprise providing an inert liquid adjacent to the electrolyte wherein the inert liquid does not undergo an electrochemical reaction with the at least one pair of electrodes. The electrolyte and the inert liquid may be immiscible.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

The figures illustrate an apparatus 1 comprising: a channel 3; at least one pair of electrodes 5 provided within sides of the channel 3; an electrolyte 7 configured to move through the channel 3 such that when the electrolyte 7 is positioned between the at least one pair of electrodes 5 the electrolyte 7 provides a current path 9 between the at least one pair of electrodes 5; and wherein the at least one pair of electrodes 5 are configured such that movement of the electrolyte 7 through the channel 3 enables a time varying voltage to be provided.

The apparatus 1 may be for providing a time varying voltage. Examples of the apparatus 1 may be used in test devices for providing a time varying voltage to a sample to enable an analyte to be detected within the sample. The apparatus 1 may be a disposable apparatus. The apparatus 1 may be discarded after use.

Figure 1:
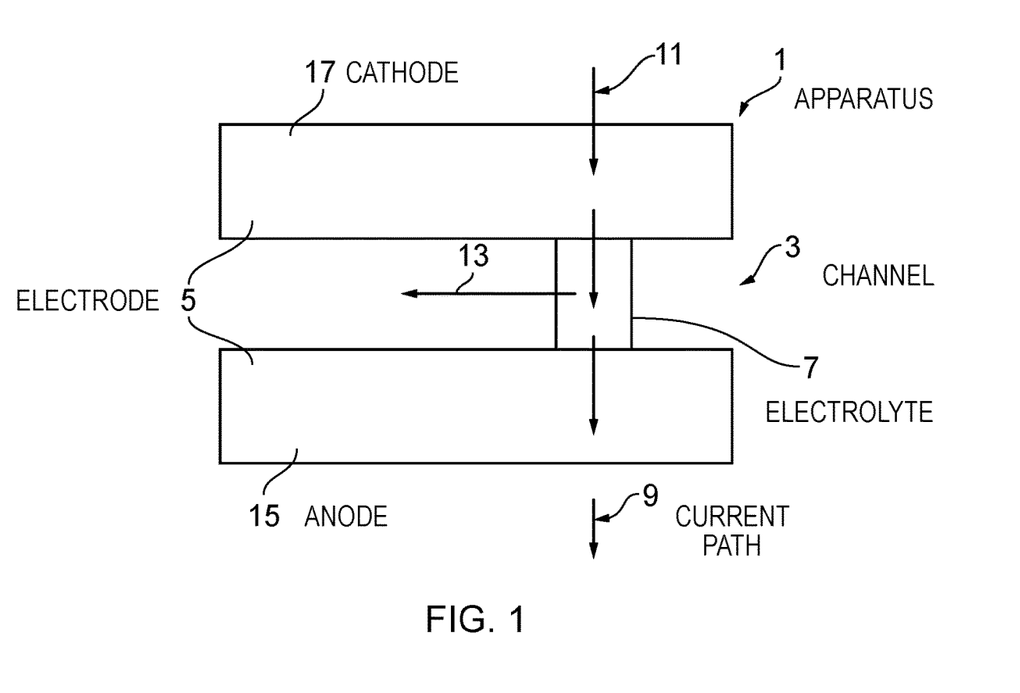
FIG. 1 illustrates an apparatus.

FIG. 1 schematically illustrates an apparatus 1 according to examples of the disclosure. The apparatus 1 comprises a channel 3, at least one pair of electrodes 5 and an electrolyte 7. In some examples the apparatus 1 may be provided within a test device. In a test device the apparatus 1 may be connected to a test sample so as to enable the time varying voltage to be provided to the test sample.

The channel 3 may comprise a passage through which the electrolyte 7 may move. The size and shape of the channel 3 may be configured so as to control the rate at which the electrolyte 7 moves through the channel 3. The electrolyte 7 may move through the channel 3 without any external or additional force being applied to the electrolyte 7 or the channel 3.

The electrolyte 7 may be provided as part of a volume of fluid. The volumes of fluid which can be provided within the channel 3 may be of the order of μL. In some examples the channel 3 may comprise a microfluidic channel. The microfluidic channel 3 may comprise means for enabling flow of a small volume of fluid. The microfluidic channel 3 may be any suitable size or shape for providing a flow path for a small volume of fluid. In other examples the channel 3 could comprise a material used in lateral flow tests such as nitrocellulose or any other suitable means.

The at least one pair of electrodes 5 may comprise an anode 15 and a cathode 17. The anode 15 and the cathode 17 may comprise different materials. The anode 15 and cathode 17 may each comprise a material which may undergo an electrochemical reaction when it is in contact with the electrolyte 7. The anode may comprise a material which undergoes oxidation with the electrolyte 7 and the cathode 17 may comprise a material which is reduced by the electrolyte 7. This enables an electrochemical cell to be formed when the electrolyte 7 is positioned between the anode 15 and the cathode 17.

The materials used for the pairs of electrodes 5 may also depend on the potential difference which is to be provided. It is to be appreciated that the materials which are used for the anode 15 and a cathode 17 may depend on the material which is used as the electrolyte 7. In some examples the electrodes 5 may comprise materials such as copper, lead, tin, nickel or cobalt or any other suitable material.

The at least one pair of electrodes 5 may be provided within the walls of the channel 3. In the example of FIG. 1 the anode 15 is provided in a first wall of the channel 3 while the cathode 17 is provided in the opposite wall. The channel 3 provides a gap between the pair of electrodes 5. The pair of electrodes 5 may be arranged so that when an electrolyte 7 is positioned within the channel 3 the electrolyte 7 may move through the gap between the pair of electrodes 5. The electrolyte 7 may enable the transfer of ions between the cathode 17 and the anode 15 and so provide a current path 9 between the electrodes 5 as indicated by the arrows 11 in FIG. 1.

In the example of FIG. 1 only one pair of electrodes 5 is provided. It is to be appreciated that in other examples of the disclosure other numbers of electrodes 5 may be provided. Examples of different arrangements of electrodes 5 are illustrated in more detail in FIGS. 2 to 9E.

the electrolyte 7 may be provided as part of a volume of fluid which is configured to flow through the channel 3. The electrolyte 7 may comprise an ionic solution which may be configured to move through the channel 3 at a controlled rate. In the example of FIG. 1 the electrolyte 7 moves along the length of the channel 3 as indicated by the arrow 13. In some examples the electrolyte 7 may only move in one direction through the channel 3.

In some examples the electrolyte 7 may comprise a liquid. In some such examples the electrolyte 7 may flow through the channel 3 by capillary action. In such examples the rate at which the electrolyte 7 moves through the channel 3 may be controlled by the dimensions of the channel 3, the surface energy of the electrolyte 7 the surface energy of the channel 3 and the viscosity of the electrolyte 7.

When the electrolyte 7 is not positioned within the channel 3 a gap is provided between the anode 15 and the cathode 17. In this arrangement there is no charge transfer between the anode 15 and the cathode 17 and no voltage is provided by the apparatus 1. When the electrolyte 7 moves into the channel 3 it comes into contact with the anode 15 and the cathode 17 and the electrochemical reactions between the electrodes 5 and the electrolyte 7 enable charge transfer between the electrodes 5. The electrochemical reactions enable the apparatus 1 to provide a voltage.

The electrodes 5 may be arranged so that the voltage that is provided is dependent upon the position of the electrolyte 7 within the channel 3. This enables a time varying voltage to be provided by the apparatus 1 as the electrolyte moves through the channel 3.

Examples of arrangements of electrodes 5 and electrolytes 7 are illustrated in more detail in FIGS. 2 to 9E.

Figure 2:
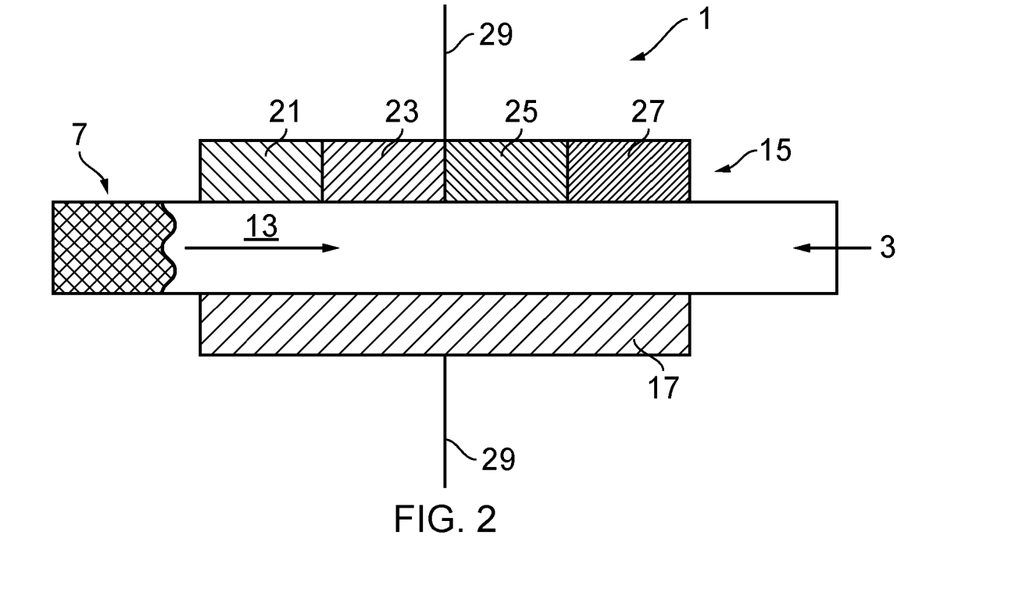
FIG. 2 illustrates an apparatus.

FIG. 2 schematically illustrates an apparatus 1 according to an example of the disclosure. The example apparatus 1 of FIG. 2 comprises a channel 3, a pair of electrodes 5 and an electrolyte 7.

In the example apparatus 1 of FIG. 2 only one pair of electrodes 5 is provided. A single contact 29 is provided to each of the electrodes 5. The contact 29 may enable each of the electrodes 5 to be connected to external circuitry. In some examples a sample may be connected to the external circuitry to enable the sample to be analysed.

The pair of electrodes comprises an anode 15 and a cathode 17. The anode 15 is provided on one side of the channel 3 and the cathode 17 is provided on the opposite side of the channel 3 so that a gap is provided between the anode 15 and cathode 17. In some examples each of the anode 15 and cathode 17 may extend for the entire length of the channel 3.

The electrolyte 7 may be arranged to flow through the gap between the anode 15 and the cathode 17. The gap between the anode 15 and cathode 17 may be sized so that the electrolyte 7 may flow through the channel 3 by capillary action. In such examples the flow rate of the electrolyte 7 may be determined by the dimensions of the channel 3 and the surface energy of the electrolyte 7. This may enable the rate at which the electrolyte 7 moves between the anode 15 and the cathode 17 to be controlled.

In the example apparatus 1 of FIG. 2 the cathode 17 is formed from a single material while the anode 15 is formed from a plurality of different materials. The cathode 17 may be formed from a material which has a positive potential compared to the anode 15. For instance, the cathode 17 may be formed from copper or any other suitable material. The anode 15 may be formed from any material which has a negative potential compared to the cathode 17. For instance the anode 15 could be formed from lead, tin, nickel, cobalt or any other suitable materials. It is to be appreciated that in other examples the anode 15 could be formed from a single material while the cathode 17 may comprise a plurality of different materials.

In the example of FIG. 2 the anode 15 comprises four different sections 21, 23, 25, 27. Each of the sections 21, 23, 25, 27 comprises a different material. It is to be appreciated that in other examples of the disclosure the anode 15 could comprise any number of different sections 21, 23, 25, 27. Also in the example of FIG. 2 each of the sections 21, 23, 25, 27 of the anode 15 comprise a different material. In other examples some sections 21, 23, 25, 27 could comprise the same material.

The different sections 21, 23, 25, 27 of the anode 15 are provided at different positions along the length of the channel 3. This ensures that the electrolyte 7 comes into contact with the different materials of the sections 21, 23, 25, 27 as the electrolyte 7 flows through the channel 3. The sections 21, 23, 25, 27 of the anode 15 may have different potentials so that the potential difference between the cathode 17 and the anode 15 varies along the length of the channel 3. In some examples adjacent sections 21, 23, 25, 27 may have different potentials.

In the example of FIG. 2 the first section 21 of the anode 15 is provided at the left hand side of the anode 15. This is the first section 21 of the anode 15 that the electrolyte 7 will come into contact with as the electrolyte 7 flows through the channel 3. This will enable an electrochemical cell to be formed between the cathode 17 and the first section 21 of the anode 15. The first section 21 of the anode 15 may comprise any suitable material such as lead.

The second section 23 of the anode 15 is provided adjacent to the first section 21. The second section 23 may be adjacent to the first section 21 so that no gap is provided between the different sections 21, 23. The second section 23 is provided on the right of the first section 21 so that as the electrolyte 7 flows through the channel 3 in the direction indicated by the arrow 13 it flows past the first section 21 and comes into contact with the second section 23. When the electrolyte 7 is in this position the electrolyte 7 forms an electrochemical cell between the cathode 17 and the second section 23 of the anode 15.

The second section 23 of the anode 15 may comprise a material which has a different potential to the first section 21. For instance where the first section 21 comprises lead, the second section 23 may comprise a material with a higher potential such as tin. This enables a larger voltage to be provided by the second section 23 of the anode 15 than is provided by the first section 21 of the anode 15.

The third section 25 of the anode 15 is provided adjacent to the second section 23. The third section 25 may be adjacent to the second section 23 so that no gap is provided between the adjacent sections 23, 25. The third section 25 is provided on the right of the second section 23 so that as the electrolyte 7 continues to flow through the channel 3 in the direction indicated by the arrow 13 it flows past the second section 23 and comes into contact with the third section 25. When the electrolyte 7 is in this position the electrolyte 7 forms an electrochemical cell between the cathode 17 and the third section 25 of the anode 15.

The third section 25 of the anode 15 may comprise a material which has a different potential to the second section 23. The third section 25 of the anode 15 may also comprise a material which has a different potential to the first section 21. For instance where the second section 23 comprises tin, the third section 25 may comprise a material with a higher potential such as nickel. This enables a larger voltage to be provided by the third section 25 of the anode 15 than is provided by the second section 23 of the anode 15.

The fourth section 27 of the anode 15 is provided adjacent to the third section 25. The fourth section 27 may be adjacent to the third section 25 so that no gap is provided between the adjacent sections 25, 27. The fourth section 27 is provided on the right of the third section 25 so that as the electrolyte 7 continues to flow through the channel 3 in the direction indicated by the arrow 13 it flows past the third section 25 and comes into contact with the fourth section 27. When the electrolyte 7 is in this position the electrolyte 7 forms an electrochemical cell between the cathode 17 and the fourth section 27 of the anode 15.

The fourth section 27 of the anode 15 may comprise a material which has a different potential to the third section 25. The fourth section 27 of the anode 15 may also comprise a material which has a different potential to the first and second sections 21, 23. For instance where the third section 25 comprises nickel, the fourth section 27 may comprise a material with a higher potential such as cobalt. This enables a larger voltage to be provided by the fourth section 27 of the anode 15 than is provided by the third section 25 of the anode 15.

In examples where the sections 21, 23, 25, 27 of the anode 15 comprise materials with progressively higher potentials the voltage provided by the apparatus 1 will increase as the electrolyte 7 flows through the channel 3. For instance, where the cathode 17 comprises copper, the first section 21 of anode 15 comprises lead, the second section 23 comprises tin, the third section 25 comprises nickel and the fourth section 27 comprises cobalt the potential difference will rise from 0.47V to 0.48V to 0.62V to 0.66V. Different potential differences could be obtained by using different materials.

The examples described above use adjacent sections with increasing potential to provide a voltage which increases with time. It is to be appreciated that other arrangements of materials could be used to provide a decreasing voltage or a waveform voltage or any other time varying voltage.

Figure 3:
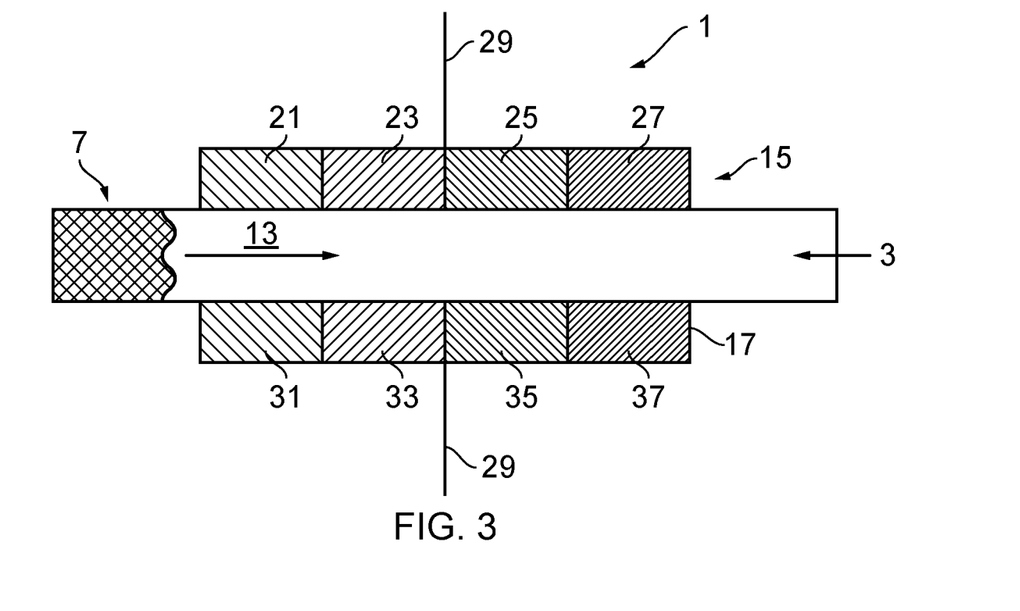
FIG. 3 illustrates an apparatus.

FIG. 3 illustrates another example apparatus 1. The example apparatus 1 of FIG. 3 also comprises a channel 3, a pair of electrodes 5 and an electrolyte 7. The apparatus 1 of FIG. 3 is similar to the apparatus 1 of FIG. 2 in that only one pair of electrodes 5 is provided. However the apparatus 1 of FIG. 3 differs from the apparatus 1 of FIG. 2 in that in FIG. 3 both the anode 15 and the cathode 17 comprise a plurality of different materials.

Having different materials in both the anode 15 and the cathode 17 may enable a wider range of potential differences to be provided.

In the example of FIG. 3 the anode 15 comprises four different sections 21, 23, 25, 27 and the cathode 17 comprises four corresponding sections 31, 33, 35, 37. It is to be appreciated that other numbers of different sections may be used in other examples of the disclosure. Also in the example of FIG. 3 each of the sections 21, 23, 25, 27 of the anode 15 and each of the sections 31, 33, 35, 37 of the cathode 17 comprise a different material. In other examples some sections 21, 23, 25, 27, 31, 33, 35, 37 could comprise the same material.

The materials for the sections 21, 23, 25, 27 of the anode 15 and the sections 31, 33, 35, 37 of the cathode 17 may be chosen so that the potential difference between the anode 15 and the cathode 17 varies along the length of the channel 3.

In the example of FIG. 3 the materials of the anode 15 and the cathode 17 may be selected so that the potential difference increases along the length of the channel 3. This will provide a voltage which increases with time. It is to be appreciated that other arrangements of materials within the anode 15 and cathode 17 could be used to provide different time varying voltages.

In example apparatus 1 such as the apparatus 1 of FIGS. 2 and 3 the rate at which the potential difference changes may depend on factors such as the flow rate of the electrolyte 7 through the channel 3, the size of the respective sections 21, 23, 25, 27 of the anode 15 and the respective sections 31, 33, 35, 37 of the cathode 17 and the rate of reaction between the electrolyte 7 and the electrodes 5 or any other suitable factor. These factors may be determined by the dimensions of the channel 3 and the materials used for the electrodes 5. This may enable different apparatus 1 to be designed to produce different time varying voltages.

In the examples of FIGS. 2 and 3 each of the sections 21, 23, 25, 27, 31, 33, 35, 37 are approximately the same size. It is to be appreciated that in other examples the sections 21, 23, 25, 27, 31, 33, 35, 37 could have different sizes. This may enable different waveforms of time varying voltage to be provided. In some examples having sections 21, 23, 25, 27, 31, 33, 35, 37 of different sizes may smooth out steps in the voltage changes as it may enable junctions to be created with the electrolyte 7 and adjacent sections of the electrodes 5. The smoothing of the steps in the voltage may occur due to the time it takes for the electrochemical reaction between the electrolyte 7 and the electrodes 5 to begin when the electrolyte 7 comes into contact with a new section 21, 23, 25, 27, 31, 33, 35, 37 of the electrodes 5. The current provided by the electrochemical cell will move from a lower potential to a higher potential so that the increase or decrease in voltage will be proportional to the ratio of the surface areas of the different sections 21, 23, 25, 27, 31, 33, 35, 37 that are undergoing the electrochemical reaction.

Figure 4:
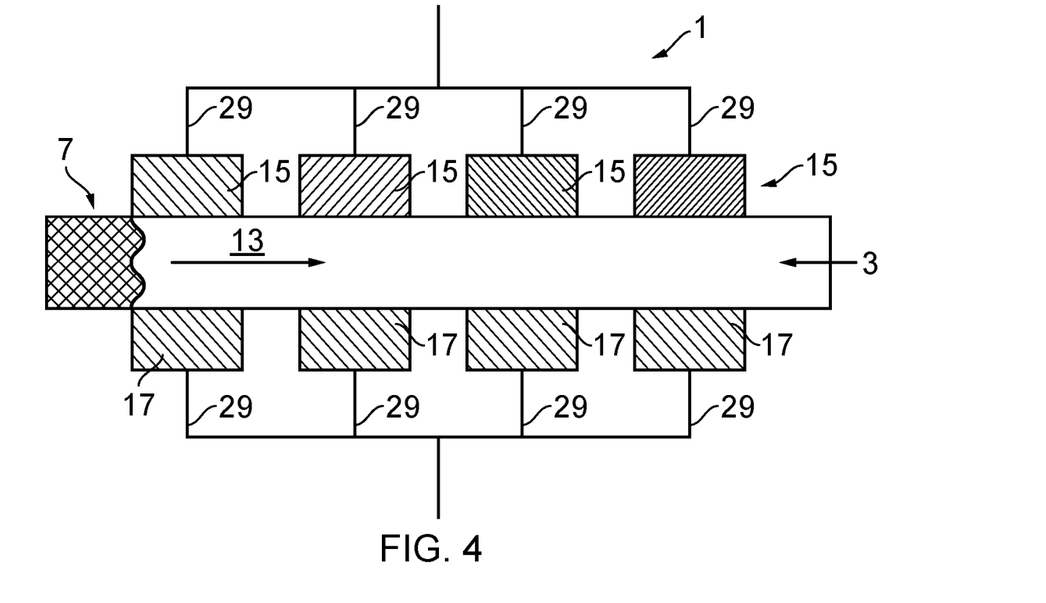
FIG. 4 illustrates an apparatus.

FIG. 4 illustrates another example apparatus 1. The apparatus 1 of FIG. 4 is similar to the apparatus 1 of FIGS. 2 and 3 in that apparatus 1 of FIG. 4 comprises a channel 3 and an electrolyte 7 which is configured to flow through the channel 3. However the apparatus 1 of FIG. 4 differs from the apparatus 1 of FIG. 1 in that in FIGS. 2 and 3 only one pair of electrodes 5 is provided whereas in FIG. 4 a plurality of different pairs of electrodes 5 are provided.

The different pairs of electrodes 5 are provided at different points along the length of the channel 3. The different pairs of electrodes 5 are arranged so that a gap is provided between each adjacent pair of electrodes 5. The spacing between the adjacent pairs of electrode 5 extends along the length of the channel 3.

In the particular example of FIG. 4 the apparatus 1 comprises four pairs of electrodes 5. It is to be appreciated that any number of pairs of electrodes 5 may be provided in other examples of the disclosure.

Each of the pairs of electrodes 5 comprises an anode 15 and a cathode 17. Each anode 15 and cathode 17 has a contact 29. The contact 29 may enable each of the electrodes 5 to be connected to external circuitry. In some examples a sample may be connected to the external circuitry to enable the sample to be analysed.

In the example apparatus 1 of FIG. 4 each of the cathodes 17 are formed from the same material while the anodes 15 are formed from a plurality of different materials. In some examples each of the anodes 15 may be formed from a different material. As different anodes 15 are formed from different materials this enables different voltages to be provided when the electrolyte 7 is positioned between different pairs of electrodes 5.

As the electrolyte 7 moves through the channel 3 in the direction indicted by the arrow 13, it comes into contact with each of the different pairs of electrodes 5. This enables the electrolyte 7 to form electrochemical cells with each of the different pairs of electrodes 5. As different anodes 15 comprise different materials with different potentials this enables different voltages to be provided as the electrolyte 7 moves along the channel 3.

Figure 5:
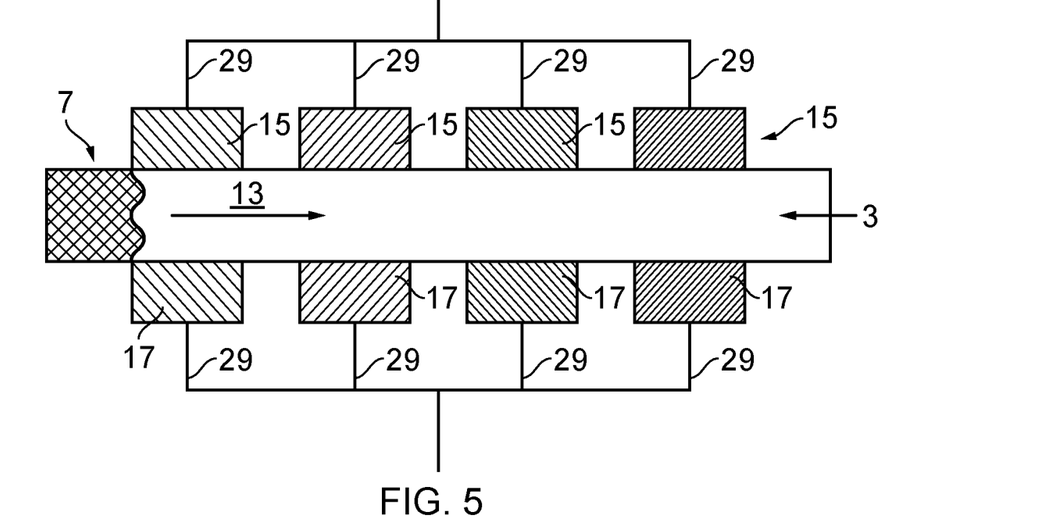
FIG. 5 illustrates an apparatus.

In the example of FIG. 4 each of the anodes 15 comprise different materials but each of the cathodes 17 comprise the same material. It is to be appreciated that in other examples each of the anodes 15 could comprise the same material and the cathodes 17 could comprise different materials. Also in some examples both the anodes 15 and the cathodes 17 could comprise different materials. FIG. 5 illustrates an example apparatus 1 in which both the anodes 15 and the cathodes 17 could comprise different materials.

In the examples of FIGS. 4 and 5 the volume of electrolyte 7 may be such that the electrolyte 7 is only in contact with one pair of electrodes 5 at any time. The volume of the electrolyte 7 and the spacing between the pairs of electrodes 5 may be such that as the electrolyte 7 breaks a connection with a first pair of electrodes 5 it immediately establishes a connection with the next pair of electrodes 5. This may ensure that a voltage is always provided by the apparatus 1 when the electrolyte 7 is moving through the channel 3.

In the example of FIGS. 4 and 5 the different pairs of electrodes 5 are equally spaced along the length of the channel 3 and the channel 3 has a constant width. It is to be appreciated that other arrangements of the channel 3 and the electrodes 5 may be used in other examples of the disclosure.

For instance, in some examples the volume of electrolyte 7 within the channel 3 may be large enough to enable more than one pair of electrodes 5 to be connected to the electrolyte 7 at a time. In some examples the volume of the electrolyte 7 may be sufficient to enable all of the pairs of electrodes 5 to be connected simultaneously. In such examples the number of pairs of electrodes 5 which are connected to the electrolyte 7 will increase as the electrolyte 7 flows through the channel 3. In other examples the volume of electrolyte 7 may be sufficient to enable a plurality, but not all, of the pairs of electrodes 5 to be connected to the electrolyte 7 simultaneously. In such examples the number of pairs of electrodes 5 which are connected to the electrolyte 7 may change as the electrolyte flows through the channel 3.

In these examples the electrolyte 7 will create a plurality of electrochemical cells connected in parallel. In some examples this may cause current flow between the cells. This effect may be minimized by having a larger spacing between the pairs of electrodes 5 or by selecting materials for the electrodes 5 to ensure that the desired voltage change is provided.

In the examples of FIGS. 4 and 5 each of the different pairs of electrodes 5 may have a different potential difference so that the voltage provided by the apparatus 1 is dependent upon the pair of electrodes 5 that the electrolyte 7 is connected to. As the pairs of electrodes 5 are spaced along the length of the channel 5 the voltage is dependent upon the position of the electrolyte 7 within the channel 3. The dimensions of the channel maybe designed so that the electrolyte flows through the channel 3 at a controlled rate. This enables the apparatus 1 to provide a time varying voltage.

In some examples each pair of electrodes 5 may have a larger potential difference than the preceding pair of electrodes 5. This may enable an increasing voltage to be provided by the apparatus 1. In other examples different arrangements of pairs of electrodes 5 may be provided. This may enable a different time varying voltage to be provided.

Figure 6:
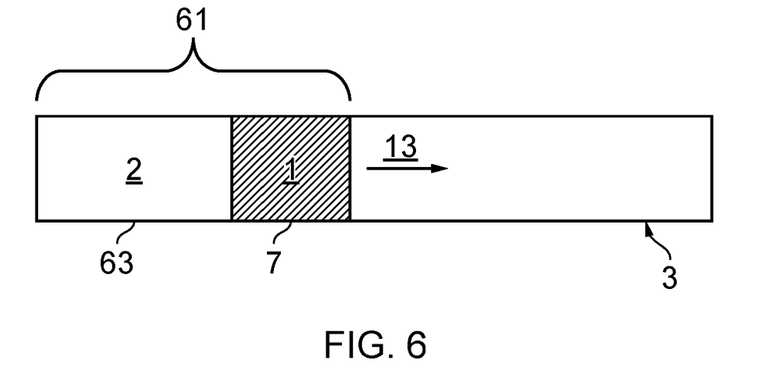
FIG. 6 illustrates an electrolyte and an inert liquid that may be provided within an apparatus.

In the examples of FIGS. 2 to 5 the apparatus 1 comprises an electrolyte 7. The electrolyte 7 may be provided as part of a volume of liquid 61. FIG. 6 illustrates an example of a volume of liquid 61 which may be used in some examples of the disclosure.

In the example of FIG. 6 the volume of liquid 61 comprises an electrolyte 7 and an inert liquid 63. The electrolyte 7 is provided at the front of the volume of liquid 61.

In the example of FIG. 6 the electrolyte 7 may comprise an ionic solution which may be configured to enable electrochemical reactions between the electrolyte 7 and the electrodes 5. The electrolyte 7 enables an electrochemical cell to be created when it is positioned between a pair of electrodes 5. The material which is used as the electrolyte 7 may depend on the material which is used for the electrodes 5.

The inert liquid 63 is provided adjacent to the electrolyte 7. The inert liquid 63 may be provided adjacent to the electrolyte 7 to ensure that a net force is provided on the electrolyte 7. The inert liquid 63 may be arranged so that the surface energy on one side of the electrolyte 7 is higher than on the other side of the electrolyte 7. The inert liquid 63 may be arranged so that the electrolyte 7 moves along the length of the channel 3 as indicated by the arrow 13.

The inert liquid 63 may comprise any material which provides an electrical insulator so that when the inert liquid 63 is positioned between a pair of electrodes 5 there is no charge transfer between the electrodes 5. The inert liquid 63 may comprise a material which does not undergo an electrochemical reaction with the at least one pair of electrode 5. The inert liquid 63 may be configured to ensure that the charge transfer is only provided through a pair of electrodes 5 which are in contact with the electrolyte 7. The inert liquid 63 may be arranged to break a connection made by the electrolyte 7 as the volume of liquid 61 moves through the channel 3.

The volume of the inert liquid 63 may be larger than the volume of the electrolyte 7. The volume of the electrolyte 7 may be selected to limit or control the areas of the electrodes 5 that are connected to the electrolyte 7. For instance, as mentioned above, the volume of electrolyte 7 may be configured so that only one pair of electrodes 5 can be connected at any one time. The volume of electrolyte 7 may be such that the length of the electrolyte 7 in the channel 3 is the same as the gap between the pairs of electrodes 5. This may prevent more than one pair of electrodes 5 being connected simultaneously and may prevent current flowing between anodes 15 and between cathodes 17. The volume of the inert liquid 63 may be large enough to be positioned between a plurality of pairs of electrodes and/or sections of electrodes 5. This may ensure that the inert liquid 63 can prevent charge transfer between pairs of electrodes 5 that are not connected to the electrolyte 7. The inert liquid 63 may prevent interference between electrodes 5.

The inert liquid 63 may be immiscible with the electrolyte 7. This may prevent the inert liquid 63 from mixing with the electrolyte 7. For instance, one of the electrolyte 7 of the inert liquid 63 may be in an organic phase while the other may be in an aqueous phase.

Figure 7:
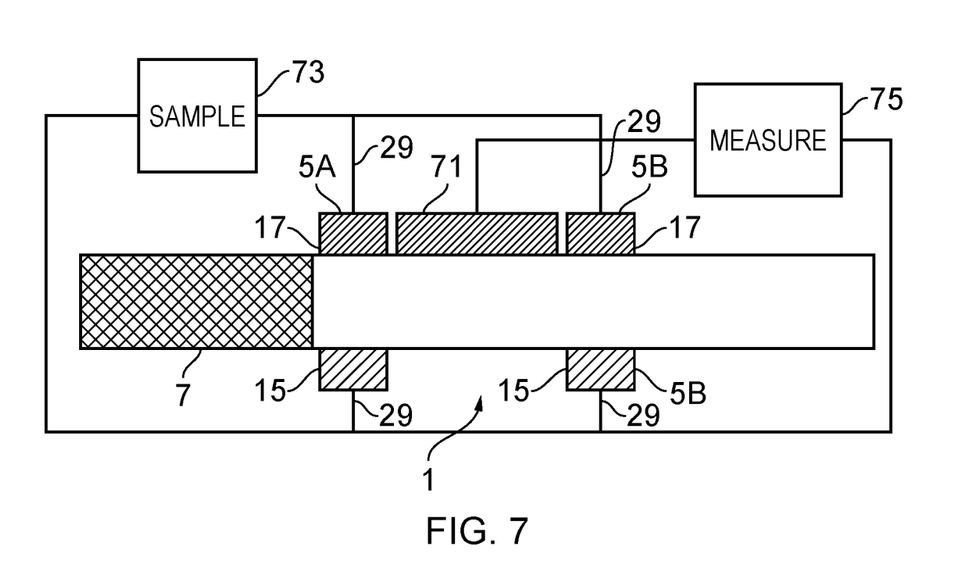
FIG. 7 illustrates an apparatus.

FIG. 7 illustrates an apparatus 1 according to another example of the disclosure. The example apparatus 1 of FIG. 7 also comprises a channel 3, at least one pair of electrodes 5 and an electrolyte 7. In the example apparatus 1 of FIG. 7 a floating electrode 71 is provided adjacent to a pair of electrodes 5. In the example of FIG. 7 the apparatus 1 is connected to sample circuitry 73 and measuring circuitry 75.

In the particular example of FIG. 7 two pairs of electrodes 5 are provided. A first pair of electrodes 5A is provided on the left hand side of the channel 3 and a second pair of electrodes 5B is provided on the right hand side of the channel. The apparatus 1 is arranged so that as the electrolyte 7 moves through the channel 3 the electrolyte 7 contacts the first pair of electrodes 5A and then the second pair of electrodes 5B.

Each pair of electrodes 5A, 5B comprises an anode 15 and a cathode 17. The anode 15 and cathode 17 may be made of different materials. The materials used for the anode 15 and the cathode 17 may be selected to ensure that the anode 15 and cathode 17 have different potentials.

For each pair of electrodes 5 the anode 15 may be positioned directly opposite the cathode 17. The anode 15 may be positioned directly opposite the cathode 17 so that the respective surface areas of the anode 15 and the cathode 17 are aligned. The surface area of the anode 15 may entirely overlap with the surface area of the cathode 17.

In the example of FIG. 7 each of the anodes 15 are made from the same material. Also in the example of FIG. 7 each of the cathodes are 17 made from the same material. Each of the electrodes 5 within the pairs of electrodes 5A, 5B has a contact 29 which enables the electrode to be connected to circuitry.

In the example of FIG. 7 the anode 15 and the cathode 17 of a pair of electrodes 5 have the same surface area. In the example of FIG. 7 the anodes 15 and the cathodes 17 of all of the pairs 5A, 5B have the same surface area.

Both the first pair of electrodes 5A and the second pair of electrodes 5B are connected to the sample circuitry 73. The sample circuitry 73 may be configured so that when the electrolyte 7 and the pairs of electrodes 5 form a cell, the voltage from the cell is provided to a sample within the sample circuitry 73. The test sample may draw a current which is proportional to an analyte that is to be measured. This may enable the presence of an analyte within a sample to be detected. For instance, it may enable ampemetric testing of the sample.

The measuring circuitry 75 may be connected to the floating electrode 71 and the anodes 15 of the pairs of electrodes 5. The measuring circuitry 75 may enable the current which is provided by the apparatus 1 to be measured.

The floating electrode 71 is provided between the first pair of electrodes 5A and the second pair of electrodes 5B. In the example of FIG. 7 the floating electrode 71 is a cathode. The floating electrode 71 is provided adjacent to the cathodes 17 of the pairs of electrodes 5A, 5B. The floating electrode 71 is provided on the same wall of the channel 3 as the cathodes 17 of the pairs of electrodes 5A, 5B.

The floating electrode 71 may comprise the same material as the cathode 17 of the adjacent pair of electrodes 5. This may ensure that the floating electrode 71 has the same potential as the cathode 17 of the adjacent pair of electrodes 5.

The floating electrode 71 is not aligned with an anode 15. The floating electrode 71 may be positioned so that there is no overlap between the surface area of the floating electrode 71 and a surface area of an anode 15.

The floating electrode 71 may be configured to collect electrons from the electrolyte 7. This reduces the current through the electrochemical cell formed by a pair of electrodes 5. The number of electrons that is collected by the floating electrode 71 is proportional to the surface area of the floating electrode 71 that is in contact with the electrolyte 7.

The floating electrode 71 may be connected to measuring circuitry 75 to enable the current drawn to be measured.

FIGS. 8A to 8H show an electrolyte 7 as it moves through the channel 3 of the example apparatus of FIG. 7. FIGS. 8A to 8H show the volume of fluid 61 at successive points in time. In the examples of FIGS. 8A to 8H the circuitry is not shown for clarity.

Figure 8A:
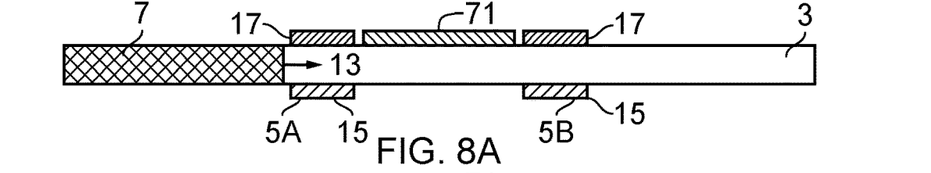
FIGS. 8A to 8H illustrate an apparatus.

At the point in time shown in FIG. 8A the electrolyte 7 is positioned at the left hand side of the channel 3. The electrolyte 7 has not yet made contact with any of the electrodes 5. In some examples the electrolyte 7 may be stored in a reservoir or a barrier may be provided to prevent the electrolyte 7 from moving through the channel 3. The apparatus 1 may be provided in the arrangement of FIG. 8A when the apparatus 1 is in storage and/or before the apparatus 1 is used. As the electrolyte 7 is not in contact with any of the electrodes 5 this prevents any chemical reaction between the electrodes 5 and the electrolyte 7. This prevents degradation of the electrodes 5 and may enable an apparatus 1 with a long shelf life to be provided.

In FIGS. 8B to 8H the barrier has been removed or the electrolyte 7 has been released from a reservoir and the electrolyte 7 is moving through the channel 3 in the direction indicated by the arrow 13. The electrolyte 7 moves through the channel 3 from right to left. In other examples the electrolyte 7 may move in other directions.

Figure 8B:
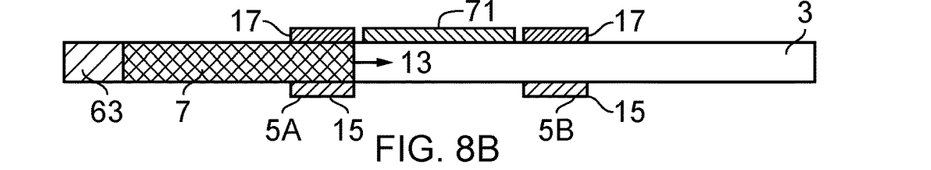

In FIG. 8B the electrolyte 7 has moved through the channel 3 so that the electrolyte 7 is positioned between the first pair of electrodes 5A. This forms an electrochemical cell comprising the first pair of electrodes 5A and the electrolyte 7. The electrolyte 7 is in contact with the entire surface area of the anode 15 and the cathode 17 within the first pair of electrodes 5. This provides the maximum voltage and the maximum current for the apparatus 1.

As the first pair of electrodes 5A are connected to the sample circuitry 73 current will be drawn from the electrochemical cell comprising the first pair of electrodes 5A and the electrolyte 7. The current which is drawn may be proportional to the analyte that is being measured within a sample.

In the example of FIG. 8B the inert liquid 63 is provided behind the electrolyte 7. At the point in time shown in FIG. 8B the inert liquid is not in contact with any of the electrodes 5, 71.

Figure 8C:
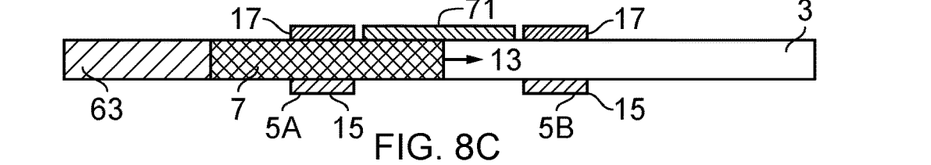

FIG. 8C shows the apparatus 1 at a later point in time. In FIG. 8C the electrolyte 7 has moved further down the channel 3 so that the electrolyte is now positioned so that at least some of the electrolyte 7 is in contact with the floating electrode 71. The volume of the electrolyte 7 is such that the electrolyte 7 is still in contact with the entire surface area of the anode 15 and the cathode 17 within the first pair of electrodes 5A.

The floating electrode 71 will react with the electrolyte 7 to collect electrons from the electrolyte 7. As the supply of the electrons is limited by the area of the anode 15 this will lead to a reduction in the current between the first pair of electrodes 5A from the time shown in FIG. 8B to the time shown in FIG. 8C. Measurements of the reduction in current can then be used to calculate the quantity of an analyte present within a sample. A high level of an analyte will draw more current and reduce the open circuit voltage measured across the anode 15 and the floating electrode 71.

In the example of FIG. 8C the inert liquid 63 is still not in contact with any of the electrodes 5, 71.

Figure 8D:
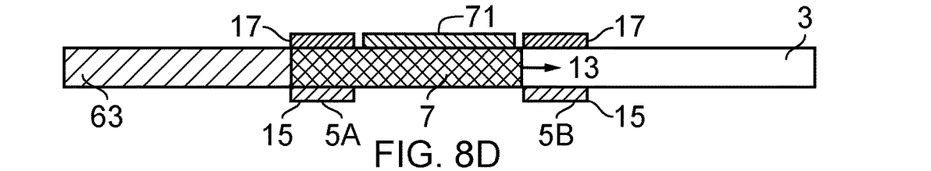

FIG. 8D shows the apparatus 1 at a further point in time. In FIG. 8D the electrolyte 7 has moved further down the channel 3 so that the electrolyte is now positioned so that the electrolyte 7 is in contact with the entire surface area of the floating electrode 71. The volume of the electrolyte 7 is such that the electrolyte 7 is still in contact with the entire surface area of the anode 15 and the cathode 17 within the first pair of electrodes 5A.

At the point in time shown in FIG. 8D the available current has reduced further. The configuration of FIG. 8D may provide the minimum current to the sample.

In the example of FIG. 8D the inert liquid 63 is still not in contact with any of the electrodes 5, 71.

Figure 8E:
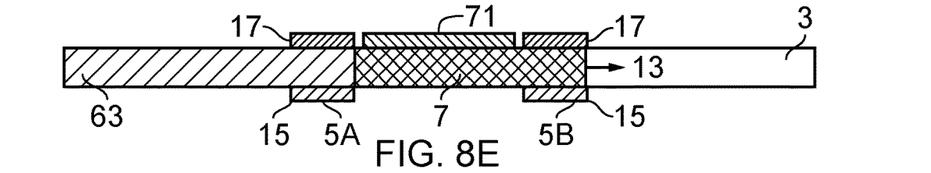

FIG. 8E shows the apparatus 1 at a further point in time. In FIG. 8E the electrolyte 7 has moved further down the channel 3 so that the electrolyte is now positioned so that the electrolyte 7 is in contact with the entire surface area of the floating electrode 71. However in FIG. 8E the electrolyte 7 is no longer in contact with the first pair of electrodes 5A but is now in contact with the entire surface area of the anode 15 and the cathode 17 of the second pair of electrodes 5B.

The volume of the electrolyte 7 and the spacing of the pairs of electrodes 5A, 5B may be such that as the electrolyte 7 comes into contact with the second pair of electrodes 5B it breaks contact with the first pair of electrodes 5A.

The current may remain constant between the time shown in FIG. 8D and the time shown in FIG. 8E. The area of the electrolyte 7 in contact with the electrodes 5, 71 may remain constant between the time shown in FIG. 8D and the time shown in FIG. 8E.

In the example of FIG. 8E the inert liquid 63 is now in contact with the first pair of electrodes 5A. The inert liquid 63 does not react with the first pair of electrodes 5A and so breaks the electrochemical cell formed by the first pair of electrodes 5A.

Figure 8F:
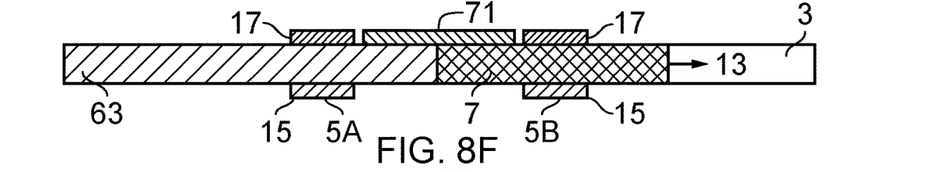

FIG. 8F shows the apparatus 1 at a further point in time. In FIG. 8F the electrolyte 7 has moved further down the channel 3 so that the electrolyte is now positioned so that the electrolyte 7 is in only in contact with part of the surface area of the floating electrode 71 but is still in contact with the entire surface area of the anode 15 and the cathode 17 of the second pair of electrodes 5B.

The current may increase between the time shown in FIG. 8E and the time shown in FIG. 8F because the area of the electrolyte 7 in contact with the floating electrode 71 has reduced.

In the example of FIG. 8F the inert liquid 63 is now in contact with the first pair of electrodes 5A and part of the floating electrode 71. The inert liquid 63 does not react with the floating electrodes 71 and so enables an increase in current.

Figure 8G:
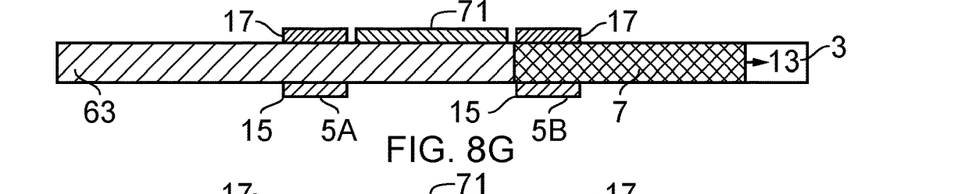

FIG. 8G shows the apparatus 1 at a further point in time. In FIG. 8G the electrolyte 7 has moved further down the channel 3 so that the electrolyte is now positioned so that the electrolyte 7 is still in contact with the entire surface area of the anode 15 and the cathode 17 of the second pair of electrodes 5B but is no longer in contact with floating electrode 71. This provides the maximum voltage and the maximum current for the apparatus 1.

The current increases between the time shown in FIG. 8F and the time shown in FIG. 8G because the area of the electrolyte 7 in contact with the floating electrode 71 has reduced.

In the example of FIG. 8G the inert liquid 63 is now in contact with the first pair of electrodes 5A and the whole of the surface area of the floating electrode 71. The inert liquid 63 does not react with the floating electrodes 71 and so enables the increase in current.

Figure 8H:
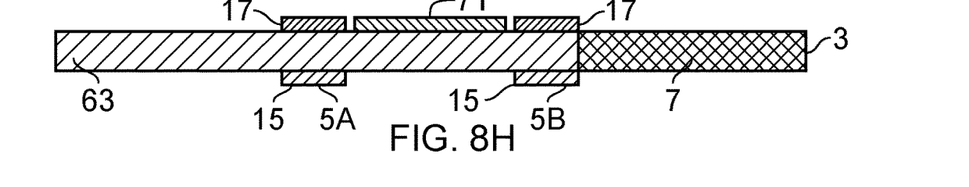

FIG. 8H shows the apparatus 1 at a further point in time. In FIG. 8H the electrolyte 7 has moved further down the channel 3 so that the electrolyte 7 is not in contact with any electrodes. The inert liquid 63 is positioned throughout the channel 3 and effectively turns the electrochemical cells off.

The apparatus 1 of FIG. 7 may be used to provide a current limited time varying voltage to a sample. The change in the voltage is determined by the current that is drawn by the sample that is being analysed. The more current that is drawn by the analyte within the sample, the more the voltage decreases. The current that is available from the cell is determined by the position of the electrolyte 7 within the channel and the amount of current which is drawn by the floating electrode 71. In the example of FIG. 7 the available current starts at a maximum, decreases and then increases back to a maximum. It is to be appreciated that other arrangements of electrodes 5, 17 may be used to provide different variations.

FIGS. 9A to 9E shows an apparatus 1 which is similar to the apparatus 1 of FIG. 7. The apparatus 1 of FIGS. 9A to 9E comprise a channel 3 and an electrolyte 7. However in FIGS. 9A to 9E only one pair of electrodes 5 is provided but two floating electrodes 71A, 71B are provided.

In FIGS. 9A to 9E a first floating electrode 71A is provided on the left hand side of the channel 3 and a second floating electrode 71B is provided on the right hand side of the channel 3. The apparatus 1 is arranged so that as the electrolyte 7 moves through the channel 3 the electrolyte 7 contacts the first floating electrode 71A and then the second floating electrode 71B.

In the example of 9A to 9E the floating electrodes 71A, 71B are cathodes. The floating electrodes 71A, 71B are provided adjacent to the cathode 17 of the pair of electrodes 5. The floating electrodes 71A, 71B are provided on the same wall of the channel 3 as the cathode 17 of the pairs of electrode 5.

The floating electrodes 71A, 71B may comprise the same material as the cathode 17 of the adjacent pair of electrodes 5. This may ensure that the floating electrodes 71A, 71B have the same potential as the cathode 17 of the adjacent pair of electrodes 5.

The floating electrodes 71A, 71B are not aligned with an anode 15. The floating electrodes 71A, 71B may be positioned so that there is no overlap between the surface area of the floating electrodes 71A, 71B and a surface area of an anode 15.

The floating electrodes 71A, 71B may be configured to collect electrons from the electrolyte 7. This reduces the current through the electrochemical cell formed by a pair of electrodes 5. The number of electrons that is collected by the floating electrodes 71A, 71B is proportional to the surface area of the floating electrodes 71A, 71B that are in contact with the electrolyte 7.

The pair of electrodes 5 is provided between the floating electrodes 71A, 71B. The pair of electrodes 5 comprises an anode 15 and a cathode 17. The anode 15 and cathode 17 may be made of different materials. The materials used for the anode 15 and the cathode 17 may be selected to ensure that the anode 15 and cathode 17 have different potentials.

The anode 15 is positioned directly opposite the cathode 17. The anode 15 may be positioned directly opposite the cathode 17 so that the respective surface areas of the anode 15 and the cathode 17 are aligned. The surface area of the anode 15 may entirely overlap with the surface area of the cathode 17.

The electrodes 5, 71A, 71B may be connected to sample circuitry to enable a current to be provided to a sample as described above.

FIGS. 9A to 9E show an electrolyte 7 as it moves through the channel 3. FIGS. 9A to 9E show the volume of fluid 61 at successive points in time. In the examples of FIGS. 9A to 9E the circuitry is not shown for clarity.

In FIGS. 9A to 9E the electrolyte 7 is moving through the channel 3 in the direction indicated by the arrow 13. The electrolyte 7 moves through the channel 3 from right to left. In other examples the electrolyte 7 may move in other directions.

Figure 9A:
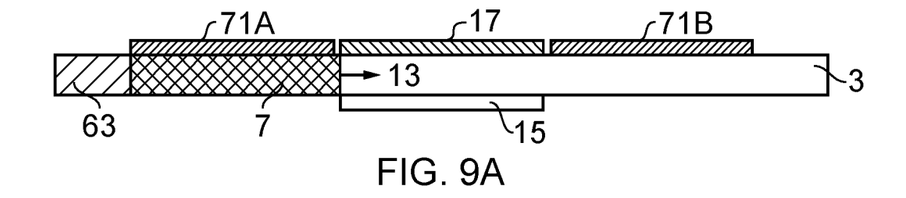
FIGS. 9A to 9E illustrate an apparatus.

In FIG. 9A the electrolyte 7 is positioned in contact with the first floating electrode 71A. The electrolyte is not in contact with the first pair of electrodes 5. As the electrolyte 7 is not in contact with both an anode 15 and a cathode 17, no electrochemical cell is provided and no current or voltage is provided by the apparatus 1.

In the example of FIG. 9A the inert liquid 63 is provided behind the electrolyte 7. At the point in time shown in FIG. 9A the inert liquid is not in contact with any of the electrodes 5, 71.

Figure 9B:
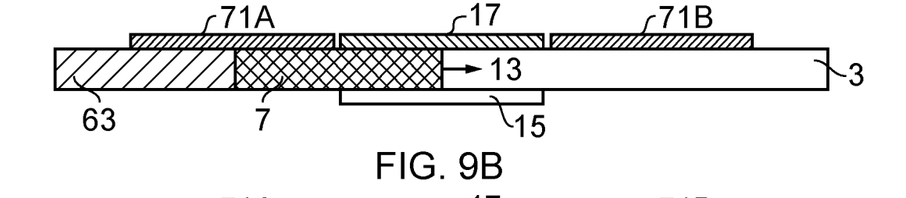

FIG. 9B shows the apparatus 1 at a later point in time. In FIG. 9B the electrolyte 7 has moved further down the channel 3 so that the electrolyte 7 is now positioned so that at least some of the electrolyte 7 is in contact with the pair of electrodes 5 and at least some of the electrolyte is in contact with the first floating electrode 71A. Only a part of the first floating electrode 71A is in contact with the electrolyte 7.

As the electrolyte 7 is now in contact with both an anode 15 and a cathode 17, an electrochemical cell is provided and current or voltage is provided by the apparatus 1. However the floating electrode 71A will react with the electrolyte 7 to collect electrons from the electrolyte 7. This will limit the available current, in proportion to the area of the floating electrode 71A which is in contact with the electrolyte 7.

In the example of FIG. 9B the inert liquid 63 is still in contact with part of the first floating electrode 71A to prevent chemical reactions with the parts of the floating electrode 71A that are not in contact with the electrolyte 7.

Figure 9C:
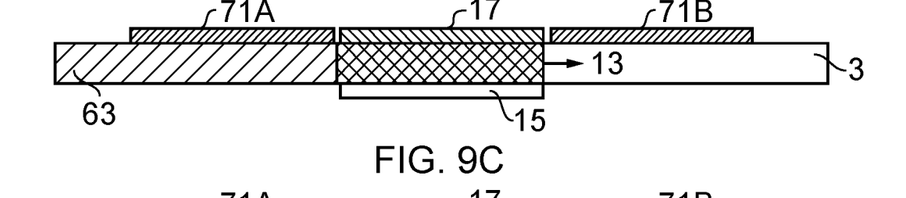

FIG. 9C shows the apparatus 1 at a later point in time. In FIG. 9C the electrolyte 7 has moved further down the channel 3 so that the electrolyte 7 is now positioned so that at least some of the electrolyte 7 is in contact with the whole of the surface area of the pair of electrodes 5. The electrolyte 7 is no longer in contact with the first floating electrode 71A and has not yet made contact with the second floating electrodes 71B. This provides the maximum voltage and the maximum current for the apparatus 1.

In the example of FIG. 9C the inert liquid 63 is still in contact with part of the first floating electrode 71A to prevent chemical reactions with the floating electrode 71A.

Figure 9D:
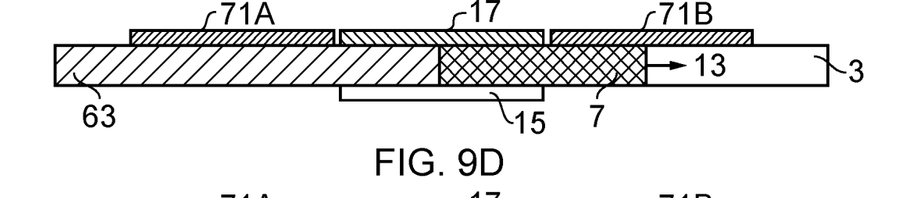

FIG. 9D shows the apparatus 1 at a later point in time. In FIG. 9D the electrolyte 7 has moved further down the channel 3 so that the electrolyte 7 is now positioned so that at least some of the electrolyte 7 is in contact with the pair of electrodes 5 and at least some of the electrolyte is in contact with the second floating electrode 71B. Only a part of the first floating electrode 71B is in contact with the electrolyte 7.

As the electrolyte 7 is still in contact with both an anode 15 and a cathode 17, an electrochemical cell is provided and current or voltage is provided by the apparatus 1. However the floating electrode 71B will react with the electrolyte 7 to collect electrons from the electrolyte 7. This will limit the available current, in proportion to the area of the floating electrode 71B which is in contact with the electrolyte 7 and reduce the current provided by the apparatus 1.

In the example of FIG. 9D the inert liquid 63 is in contact with part of the pair of electrodes 5 to prevent chemical reactions with the parts of the pair of electrodes that are not in contact with the electrolyte 7.

Figure 9E:
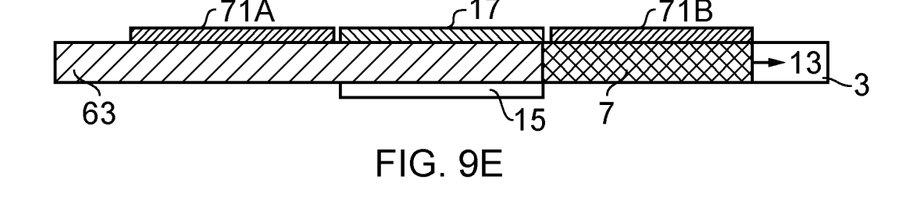

In FIG. 9E the electrolyte 7 is positioned so that it is only in contact with the second floating electrode 71A. The electrolyte is not in contact with the pair of electrodes 5. As the electrolyte 7 is no longer in contact with both an anode 15 and a cathode, no electrochemical cell is provided and no current or voltage is provided by the apparatus 1.

In the example of FIG. 9E the inert liquid 63 is provided in between the pair of electrodes 5 to prevent a current being provided.

Therefore the example apparatus 1 of FIGS. 9A to 9E provide a voltage which starts from zero, increases to maximum and then decreases back to zero. It is to be appreciated that the polarity and the magnitude of the voltage could be altered by using different materials for the respective electrodes 5, 71.

Figure 10A:
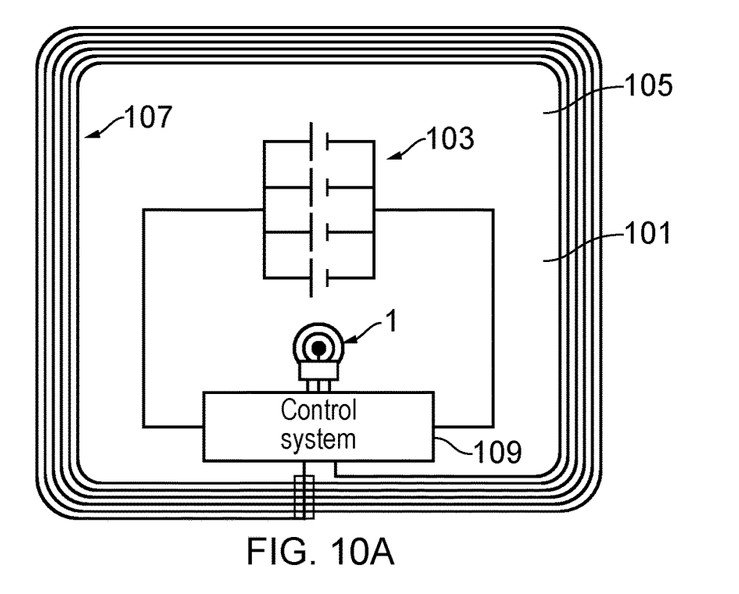
FIGS. 10A to 10B illustrates an example test device.
Figure 10B:
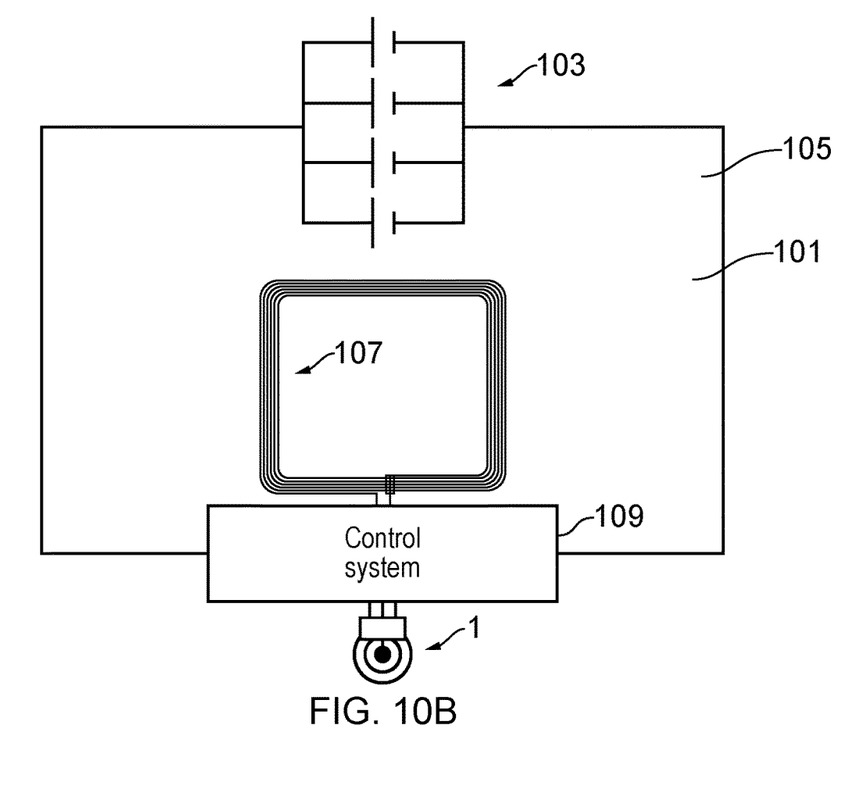

FIGS. 10A to 10B illustrates an example test devices 101. The example test devices 101 comprise an apparatus 1 which may be as described above. The example test devices 101 also comprise, a power source 103 and a control circuitry 109 and a transceiver 107.

In some examples the test devices 101 may be provided on a substrate 105. The substrate may comprise a material such as card or plastic. This may enable the test device 101 to be portable and/or low cost.

The apparatus 1 may be connected to the control circuitry 109. The control circuitry 109 may enable a sample to be positioned on the test device and a current to be provided to the sample. In some examples the control circuitry 109 may comprise sample circuitry 73 and measuring circuitry 75 as described above. The current provided to the sample may be controlled by the apparatus 1. This enables a current limited time varying voltage to be provided to the sample.

The power source 103 may comprise any suitable means. The power source 103 may be connected to the apparatus 1 to enable a current to be provided by the apparatus 1.

The test device 101 may also comprise a transceiver 107. The transceiver 107 may comprise a low power or passive transceiver 107. For example the transceiver 107 could comprise an RFID (radio frequency identification) antenna. The transceiver 107 may be coupled to the control circuitry 109 to enable information which is obtained by the control circuitry 109 to be read by another device.

Figure 11:
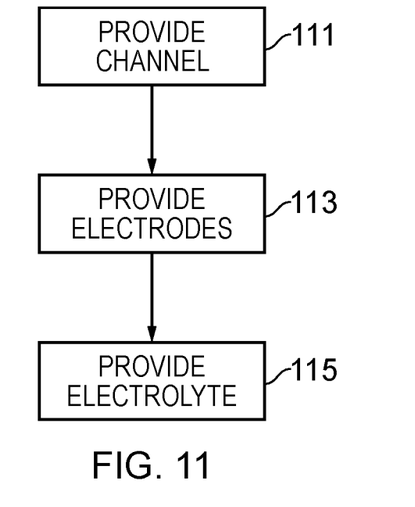
FIG. 11 illustrates a method.

FIG. 11 illustrates a method. The method may be used to provide apparatus 1 and test devices 101 such as the apparatus 1 and test devices 101 described above.

In the example of FIG. 11 the method comprises, at block 111 providing a channel 3. At block 113 the method may comprise providing at least one pair of electrodes 5 provided within sides of the channel 3 and at block 115 the method comprises providing an electrolyte 7 configured to move through the channel 3 such that when the electrolyte 7 is positioned between the at least one pair of electrodes 5 the electrolyte 7 provides a current path 9 between the at least one pair of electrodes 5. The at least one pair of electrodes 5 are configured such that movement of the electrolyte 7 through the channel 3 enables a time varying voltage to be provided.

Examples of the disclosure provide an apparatus 1 which may be used to provide a time varying voltage. The time varying voltage may be achieved by the movement of the conductor 7 through the channel 3. As this does not require any complicated circuitry, such as microcontroller, timing circuitry, memory or other components this provides a simple and low cost apparatus 1 for providing such voltages.

The apparatus 1 may be used in disposable devices which may be discarded after use. This may be useful for medical applications where biological samples may be tested using the time varying voltage.

As the electrolyte 7 is only in contact with the electrodes 5, 71 during use, and not during storage, this may enable a wider range of materials to be used for the electrodes and the electrolyte 7. For instance it may enable an electrolyte 7 to be used with a material which may be etched by the electrolyte 7. As the electrolyte 7 can only react with the electrode 5, 71 during the time it takes to traverse the channel this will limit the amount of etching which may occur. This may enable very thin electrodes 5, 71 to be used which may reduce the cost of the apparatus 1 as it reduces the materials required.

The apparatus 1 and test device 101 may also be small and light weight which may enable them to be used in any location.

In the examples described above the term coupled means operationally coupled and any number or combination of intervening elements can exist (including no intervening elements).

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
  a channel;
  at least one pair of electrodes,
    each pair of the at least one pair of electrodes having a first electrode and a second electrode,
    the first electrode and the second electrode being within opposite sides of the channel,
    the first electrode comprising material configured to undergo oxidation with an electrolyte and the second electrode comprising material configured to undergo reduction with the electrolyte,
    the first electrode being an anode and the second electrode being a cathode when the first electrode and the second electrode are in contact with an electrolyte in the channel,
    at least one electrode of the at least one pair of electrodes comprising different materials at different points along the length of the channel, causing a potential difference between the at least one pair of electrodes and the electrolyte that is dependent upon the position of the electrolyte within the channel,
    wherein the electrolyte, movable through the channel, is configured to be positioned between the first electrode and the second electrode, wherein the electrolyte provides a path for electric current generated by the first electrode, the second electrode, and the electrolyte, and enables via the path a potential difference between the first electrode and the second electrode to be realized,
    wherein the at least one pair of electrodes, responsive at least to movement of the electrolyte through the channel, causes a time-varying voltage to be generated between the at least one pair of electrodes, at least because of the different materials and the potential differences of the at least one pair of electrodes at the different points along the length of the channel;
  a first contact on the first electrode;
  a second contact on the second electrode; and
  sample circuitry connected across the first contact and the second contact, said sample circuitry being adapted to cause the at least one pair of electrodes to deliver the time-varying voltage to a test sample to be analyzed using the time-varying voltage.

2. The apparatus as claimed in claim 1 wherein the electrolyte comprises anionic solution configured to undergo an electrochemical reaction with the at least one pair of electrodes.

3. The apparatus as claimed in claim 1 wherein an inert liquid is provided adjacent to the electrolyte, and wherein the inert liquid is configured to not undergo an electrochemical reaction with the at least one pair of electrodes.

4. The apparatus as claimed in claim 3 wherein the electrolyte and the inert liquid are immiscible.

5. The apparatus as claimed in claim 1 wherein the sample circuitry is configured so the time-varying voltage provides a current to the test sample to enable an analyte to be detected within the test sample.

6. The apparatus as claimed in claim 1 wherein the channel and the electrolyte are configured such that the electrolyte is configured to move through the channel at a controlled rate.

7. The apparatus as claimed in claim 1 wherein the channel comprises a microfluidic channel.

8. A test device comprising an apparatus as claimed in claim 1.

9. An apparatus comprising:
  a channel;
  at least one pair of electrodes,
    each pair of the at least one pair of electrodes having a first electrode and a second electrode,
    the first electrode and the second electrode being within opposite sides of the channel,
    the first electrode comprising material configured to undergo oxidation with an electrolyte and the second electrode comprising material configured to undergo reduction with the electrolyte,
    the first electrode being an anode and the second electrode being a cathode when the first electrode and the second electrode are in contact with an electrolyte in the channel,
    wherein the electrolyte, movable through the channel, is configured to be positioned between the first electrode and the second electrode, wherein the electrolyte provides a path for electric current generated by the first electrode, the second electrode, and the electrolyte, and enables via the path a potential difference between the first electrode and the second electrode to be realized,
    wherein the at least one pair of electrodes, responsive at least to movement of the-electrolyte through the channel, causes a time-varying voltage to be generated between the at least one pair of electrodes,
  a first contact on the first electrode;
  a second contact on the second electrode;
  sample circuitry connected across the first contact and the second contact, said sample circuitry being adapted to cause the at least one pair of electrodes to deliver the time-varying voltage to a test sample to be analyzed using the time-varying voltage, and
  at least one floating electrode provided in a wall of the channel.

10. The apparatus as claimed in claim 9 the floating electrode is configured to reduce current through the at least one pair of electrodes by collecting electrons from the electrolyte.

11. The apparatus as claimed in claim 9 wherein the at least one floating electrode comprises the same material as in the cathode of the at least one pair of electrodes.

12. The apparatus as claimed in claim 9 wherein the at least one floating electrode does not overlap another electrode.

13. A method comprising:
  providing a channel; and
  providing at least one pair of electrodes,
    each pair of the at least one pair of electrodes having a first electrode and a second electrode, the first electrode and the second electrode being within opposite sides of the channel, the first electrode comprising material undergoing oxidation with an electrolyte and the second electrode comprising material configured to undergo reduction with the electrolyte, the first electrode being an anode and the second electrode being a cathode when the first electrode and the second electrode are in contact with an electrolyte in the channel, at least one electrode of the at least one pair of electrodes comprising different materials at different points along the length of the channel, causing a potential difference between the at least one pair of electrodes and the electrolyte that is dependent upon the position of the electrolyte within the channel, causing the electrolyte to move through the channel, and to be positioned between the first electrode and the second electrode, wherein the electrolyte provides a path for electric current generated by the first electrode, the second electrode, and the electrolyte, and enables via the path a potential difference between the first electrode and the second electrode to be realized, configuring the at least one pair of electrodes, responsive at least to movement of the electrolyte, to cause a time-varying voltage to be provided between the at least one pair of electrodes, at least because of the different materials and the potential difference of the at least one pair of electrodes at the different points along the length of the channel, wherein sample circuitry is connected across a first contact to the first electrode and a second contact to the second electrode, said sample circuitry causing the at least one pair of electrodes to deliver the time-varying voltage to a test sample to be analyzed using the time-varying voltage.

* * * * *